UNITED STATES PATENT OFFICE.

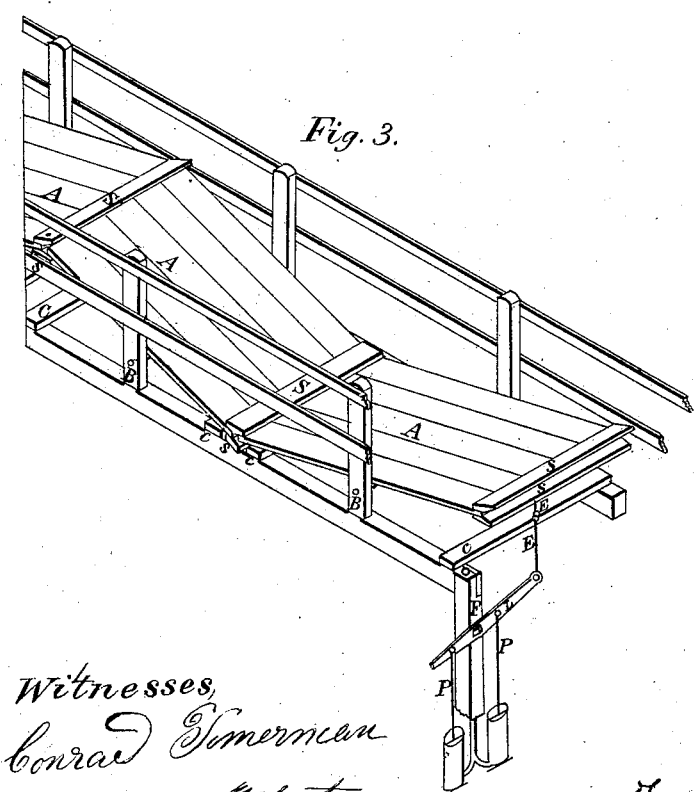

ZATTER F. WILDER, OF PAINTED POST, NEW YORK.

METHOD OF RAISING WATER BY ANIMAL POWER.

Specification of Letters Patent No. 25,598, dated September 27, 1859.

*To all whom it may concern:*

Be it known that I, ZATTER F. WILDER, of the village of Painted Post, in the county of Steuben, in the State of New York, have invented a new and useful improvement in the arrangement and combination of levers attached to pumps by which cattle and other stock are enabled to pump water for their own use at any time; and I do hereby declare that the following is a full and exact description thereof, reference being had to the accompanying drawings, and to the letters of reference marked thereon.

Figure 1 represents the surface of a series of platforms or levers, which we term the walk, and also the journals in the centers upon which they turn or roll. Fig. 2 is a side elevation of the frame and represents the position of the levers at work, their connection with each other and their attachment to the pumps. Fig. 3 is a perspective view.

The nature of my invention consists, not in the use of a platform in connection with a pump so that cattle can pump their own water, but in the arrangement, in the manner hereinafter described, of a series of platforms in combination with a pump, whereby a series or a succession of strokes of the pump piston are produced before the cattle arrive at the drinking trough, and thus a sufficient quantity of water raised with a small pump to supply the wants of the cattle.

To enable others skilled in the art to make and use my invention, I will proceed to describe its construction and operation.

I usually make my platforms or levers A, A, A Figs. 1, 2, 3, 12 feet long, three feet wide and of two inch plank, each one balanced and resting upon an oak plank in the center with journals on each end J, J, J, Fig. 1, said journals being about two inches diameter and four inches long, (a bar of iron may be substituted for this oak plank and the journals.) These journals rest in suitable holes or boxes in the post B, B, Figs. 2, 3, or in the sills; so that sufficient weight on either side of the longitudinal center of the platform will cause the platform to roll or turn upon the journals in the center, bringing the end with the weight down upon the crop sills C', C', Figs. 2, 3, and the opposite end of the platform up to a corresponding distance above the level of journals as shown over the crop sills C, C, Figs. 2, 3. I make the rise and fall of the ends of the platforms or levers or the distance traversed about one foot. Across the entire width on one end of each platform I bolt or spike on two, two inch plank, eight inches wide beveled from the center to one inch on the edge or so as to fit the angle of the platforms, one on the upper and one on the under side S, S, S, Figs. 1, 2, 3. Each of these plank project sufficiently to cover the ends and cause to raise or settle the next platform. These planks may be bolted one on the upper side of one end of one platform and the other upon the underside of the next platform, each projecting so as to lap upon the end of the next platform in such a manner that the rolling or turning of one platform will cause a like motion of all the platforms or levers and the pistons of the pump, at the same time. (The platforms may be connected by mortise and tenon as shown by the accompanying model.)

I attach my walk or series of levers and platforms to the pump or pumps by an eye bolt, nut and washer through the middle or any other plank of the platform about four or six inches from the end of the platforms E, E, Figs. 2, 3. These eye bolts are fastened by other eye bolts to the lever L, Figs. 2, 3, which works the pistons of the pump P, P, Fig. 3 with bolts or pins, and the lever L Figs. 2, 3, is bolted fast to a post running down into the well, attached to the sill, F, Fig. 3, by bolt or mortise or both. This post can be bored and used for the water pipe.

The lever L and the attachments to the platforms, may be so arranged as to raise any required quantity at each action, or raise and fall of a platform, with the weight of an ordinary sized cow, ox, or horse, passing over the platforms or walk.

My platforms or levers A, A, A, Figs. 1, 2, 3 of the walk, may be made to any desired length, width, number and fall to suit customers.

What I claim as my invention and desire to secure by Letters Patent, is

The arrangement of a series of platforms in combination with a pump so that a series or a succession of strokes of the pump piston shall be produced before the cattle arrive at the drinking trough, substantially as and for the purposes herein set forth.

ZATTER F. WILDER.

Witnesses:
CONRAD TIMERMAN,
FRANCIS WHITE.